United States Patent
Zander et al.

(10) Patent No.: US 7,220,374 B2
(45) Date of Patent: *May 22, 2007

(54) MOLDED FOAM VEHICLE ENERGY ABSORBING DEVICE AND METHOD OF MANUFACTURE

(75) Inventors: Robert J Zander, Troy, MI (US); Richard Kucejko, Troy, MI (US); Michael P Williams, II, Bloomfield Hills, MI (US)

(73) Assignee: Cadillac Products Automotive Company, Troy, MI (US)

( * ) Notice: Subject to any disclaimer, the term of this patent is extended or adjusted under 35 U.S.C. 154(b) by 139 days.

This patent is subject to a terminal disclaimer.

(21) Appl. No.: 10/969,201

(22) Filed: Oct. 20, 2004

(65) Prior Publication Data

US 2005/0089674 A1 Apr. 28, 2005

Related U.S. Application Data

(63) Continuation-in-part of application No. 10/691,366, filed on Oct. 22, 2003, now Pat. No. 6,949,209.

(51) Int. Cl.
*B29C 44/02* (2006.01)

(52) U.S. Cl. ............... 264/51; 29/458; 29/527.1; 264/54

(58) Field of Classification Search .......... 29/527.1, 29/458; 264/51, 53
See application file for complete search history.

(56) References Cited

U.S. PATENT DOCUMENTS

| | | | |
|---|---|---|---|
| 3,436,446 A | 4/1969 | Angell, Jr. | |
| 3,493,257 A | 2/1970 | Fitzgerald et al. | |
| 3,666,310 A | 5/1972 | Burgess et al. | |
| 3,940,467 A | 2/1976 | Brachman | |
| 4,078,837 A | 3/1978 | Auth | |
| 4,406,489 A | 9/1983 | Trabert | |
| 4,806,293 A | * 2/1989 | Akiyama et al. | 264/53 |
| 4,904,008 A | 2/1990 | Glance | |
| 4,941,701 A | 7/1990 | Loren | |
| 5,096,243 A | 3/1992 | Gembinski | |
| 5,106,137 A | 4/1992 | Curtis | |
| 5,180,628 A | 1/1993 | Haardt et al. | |
| 5,266,619 A | 11/1993 | Terada et al. | |
| 5,423,673 A | 6/1995 | Sawae et al. | |
| 5,577,784 A | 11/1996 | Nelson | |
| 5,609,374 A | 3/1997 | Sawae et al. | |
| 5,799,991 A | 9/1998 | Glance | |
| 5,804,511 A | 9/1998 | Kelman et al. | |
| 5,988,713 A | 11/1999 | Okamura et al. | |
| 6,146,565 A | 11/2000 | Keller | |

(Continued)

OTHER PUBLICATIONS

PCT International Search Report and Written Opinion of the International Searching Authority, Mailed Feb. 28, 2005 (7 pgs).

*Primary Examiner*—Allan R. Kuhns
(74) *Attorney, Agent, or Firm*—Harness, Dickey & Pierce, P.L.C.

(57) ABSTRACT

A method for forming energy absorbing components for motor vehicles includes mixing a polymeric resin and blowing agent combination. The combination is heated to liquefy it. A mold for receiving the liquefied combination is cooled. The liquefied combination is injected into the mold in less than 1.5 seconds and preferably in 0.5 seconds or less.

29 Claims, 5 Drawing Sheets

U.S. PATENT DOCUMENTS

| | | |
|---|---|---|
| 6,168,742 B1 | 1/2001 | Yamamoto |
| 6,270,131 B1 | 8/2001 | Martinez et al. |
| 6,308,999 B1 | 10/2001 | Tan et al. |
| 6,398,275 B1 | 6/2002 | Härtel et al. |
| 6,406,081 B1 | 6/2002 | Mahfet et al. |
| 6,548,000 B1 | 4/2003 | Gobled et al. |
| 6,555,039 B1 | 4/2003 | Porter |
| 6,595,502 B2 | 7/2003 | Koch et al. |
| 6,884,823 B1 * | 4/2005 | Pierick et al. ............ 521/79 |
| 6,949,209 B2 * | 9/2005 | Zander et al. ............ 264/51 |
| 2003/0017325 A1 | 1/2003 | Akimoto et al. |

* cited by examiner

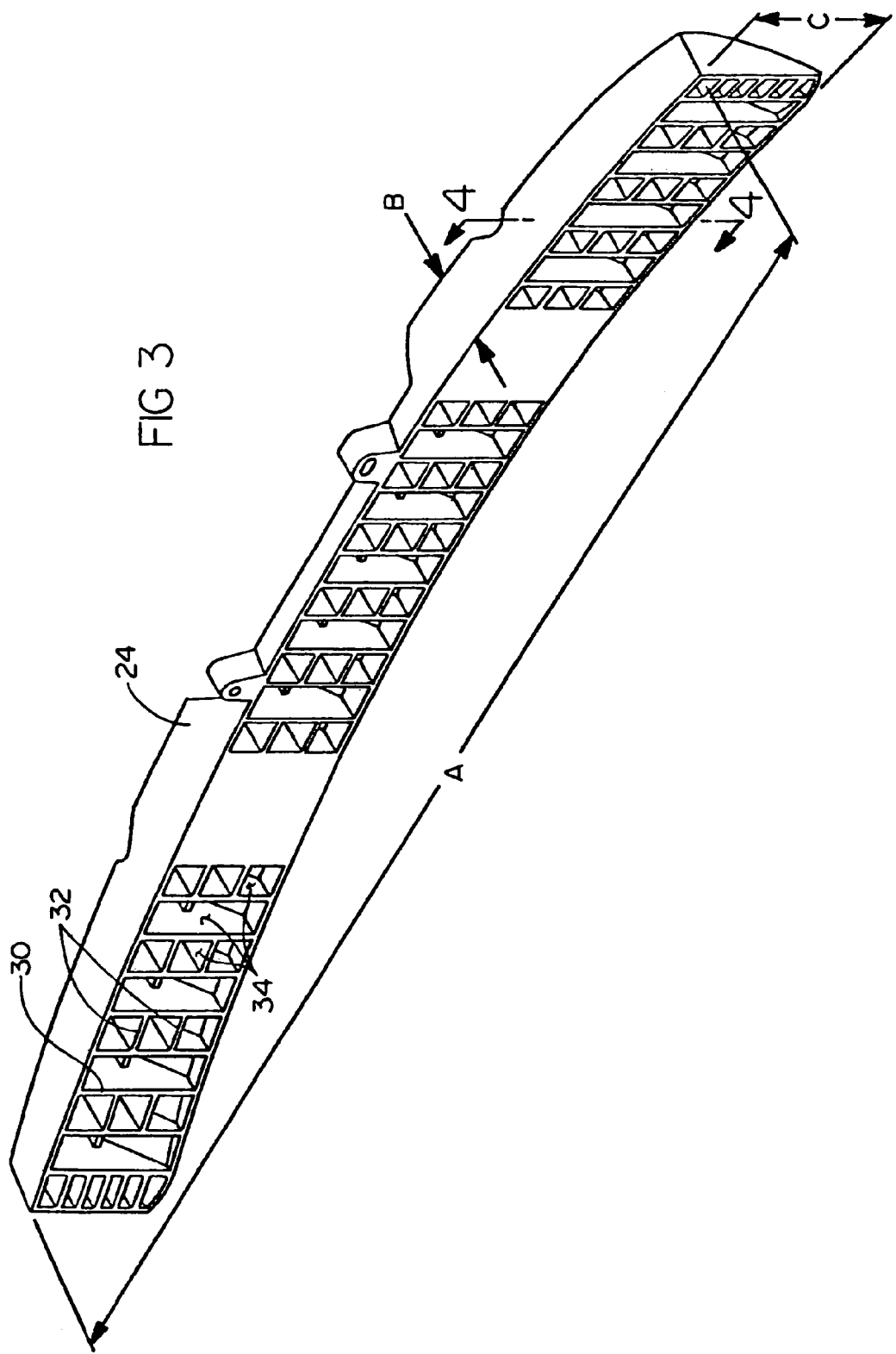

MOLDED FOAM VEHICLE ENERGY ABSORBING DEVICE AND METHOD OF MANUFACTURE

CROSS-REFERENCE TO RELATED APPLICATIONS

This application is a continuation-in-part of U.S. patent application No. 10/691,366 filed on Oct. 22, 2003. The disclosure of the above application is incorporated herein by reference.

FIELD OF THE INVENTION

The present invention relates generally to energy absorption devices and more specifically to a device and method for forming a molded foam automotive bumper insert.

BACKGROUND OF THE INVENTION

Modern automotive bumpers are commonly designed to meet impact load standards such that the bumper absorbs an impact energy (typically the energy transferred by a 5 mph impact of the vehicle with an object) without damage to or activation of the vehicle's safety systems. These bumpers are typically formed using one or more metal plates, often having an energy absorbing material attached to the plate, or having a polymeric foam element acting as an energy absorbing material provided within one or more cavities of the bumper. Because the energy absorbing material typically does not meet surface finish requirements for painting, a fascia, usually formed from a metal or a molded polymeric part, forms an outer cover, which is either coated or painted, or includes the desired color in the polymeric material.

Foam bumper energy absorption elements are traditionally made by placing polymeric beads within a mold cavity, and passing steam through the mold cavity to melt the beads together to form the element. This process is commonly referred to as steam chest molding. Steam chest molding has several drawbacks. For example, the foam bead material is expensive, thereby increasing the finished part cost. Due to the amount of time required to first melt all of the bead material and subsequently to cool both the foam material and the mold, mold cycle time is long, up to about ten minutes or longer. Lengthy mold cycle time further increases the per part cost and decreases production efficiency.

A process wherein liquid polymer is poured into a mold is also known to form energy absorbing material. This process involves mixing two liquefied component parts, typically a base polymer and a catalyst. The liquid foam mixture is poured into a mold and the part is allowed to solidify before removal from the mold. A chemical reaction occurs when the two component parts are mixed, resulting in expansion and hardening of the foam. This process is suitable for use in open, simple part molds, but may not be suitable to form complex geometric part shapes because the expanding foam may not enter or fill all cavities of the mold. There are also limitations in the foams made in this manner due to the inherent material and process limitations.

An injection molding process offers advantages over the steam chest molding and pouring processes. A broader and therefore less expensive range of resin materials can be used with the injection molding process and a more complex part geometry can be obtained, including the use of apertures and ribs to reduce material thickness and vary part stiffness. Several drawbacks exist, however, for current energy absorbing components formed using the injection molding process. Non-foam polymer material has been used in known energy absorbing components due to previous problems with processing foam material. Such non-foam components are substantially "thin walled" and are commonly rigid. A typical wall thickness ranges from about 1–4 mm. These "thin walled" components often transfer too much bumper impact energy to the vehicle or crush/distort without absorbing sufficient impact energy.

SUMMARY OF THE INVENTION

According to a first preferred embodiment of the present invention, a method for forming energy absorbing components for vehicles includes mixing a combination of a polymeric material resin and a blowing agent. The combination is heated to form a liquefied combination. The liquefied combination is pressurized to prevent substantial expansion of the liquefied combination prior to injection (or extrusion). A mold operable to receive the liquefied combination is pre-cooled. The liquefied combination is injected (or extruded) under pressure into the mold to form an energy absorbing component of a vehicle.

According to a second preferred embodiment of the present invention, a process to produce energy absorbing material includes predetermining a wall thickness for an energy absorbing component. A mold is formed for the energy absorbing component. A combination having a polymeric material resin and a blowing agent is mixed and heated to form a liquefied combination. The liquefied combination is injected (or extruded) into the mold, and by controlled temperature, pressure and inflow rates a foam part is formed.

In another aspect of the present invention, a foam body for an energy absorbing insert for a vehicle includes a polymeric material mixed with a blowing agent to form the foam body. The foam body includes a substantially uniform first face and an opposed second face. In still another aspect of the present invention, an impact resistant insert is produced by a process of the present invention.

Advantages of the present invention include a foam impact absorbing material formed by an injection molding or an extrusion process, which produces a less costly part from less costly base materials. By selectively cooling the mold used to form the part(s), and controlling part wall thickness and geometry, mold cycle time is reduced from about ten minutes for previous non-foam injection molded parts to about one minute.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of a foam member of the present invention;

DETAILED DESCRIPTION OF THE PREFERRED EMBODIMENTS

The following description of the preferred embodiments is merely exemplary in nature and is in no way intended to limit the invention, its application, or uses.

Figure 1:
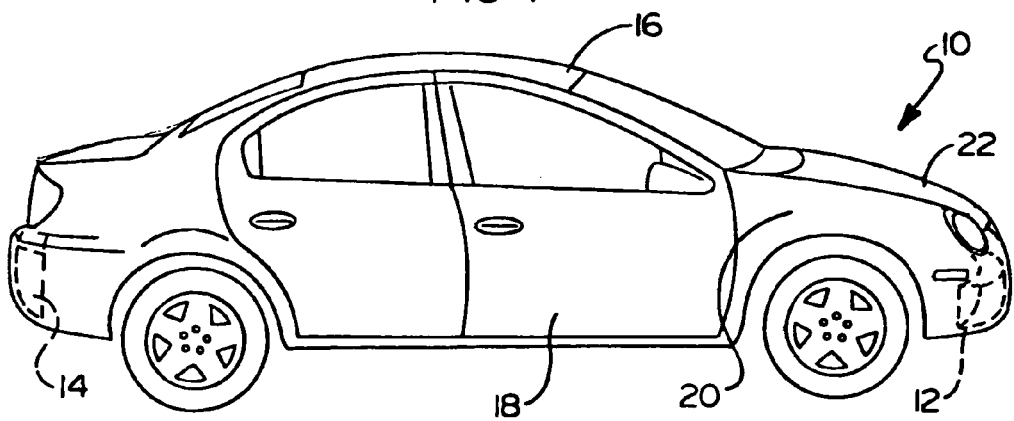
FIG. 1 is a side perspective view of a vehicle having a molded foam vehicle energy absorbing system of the present invention.

As best seen in FIG. 1, according to a preferred embodiment of the present invention, a molded foam vehicle energy absorbing system 10 can be applied to various locations including a front bumper 12 and a rear bumper 14 of a vehicle 16. In alternate embodiments of the present invention, the molded foam vehicle energy absorbing system 10 of the present invention can also be used in a door panel 18, a body panel 20, or a hood 22 of vehicle 16.

Figure 2:
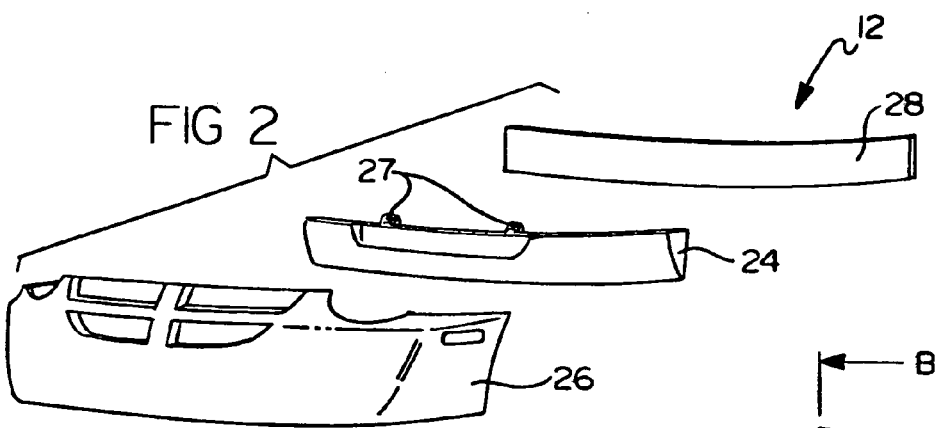
FIG. 2 is a perspective assembly view of an exemplary application of the present invention wherein a foam member is placed between a bumper fascia, and a bumper plate.

As seen in FIG. 2 in the preferred embodiment, a foam member 24 is formed and shaped to be inserted and/or received within a bumper fascia 26. In the embodiment shown, bumper fascia 26 having foam member 24 inserted therein, is supported from a bumper plate 28 of front bumper 12. Foam member 24 is retained within bumper fascia 26 by friction fit in close conformity to the geometry of bumper fascia 26. Attachment members 27 can also be provided as part of foam member 24 for mechanical attachment of foam member 24, bumper fascia 26 and bumper plate 28 to vehicle 16 (shown in FIG. 1).

Referring next to FIG. 3, foam member 24 typically includes a plurality of foam ribs 30 having generally perpendicularly extending foam cross-ribs 32 joined thereto, forming a plurality of partial cavities 34. The geometry and location of foam ribs 30 and foam cross-ribs 32 along with the fascia wall thickness of foam member 24, control the stiffness and the energy absorption capability of foam member 24. Employing partial cavities 34 also affects the overall weight as well as the stiffness of foam member 24. Foam member 24 typically includes a part length "A", a part depth "B", and a part height "C". The geometry of foam member 24 can be varied such that the foam member 24 can be slidably fit and received within bumper fascia 26. Other methods for attaching foam member 24 to bumper fascia 26 include fasteners, adhesives, and controlling a surface finish of foam member 24 to promote adherence to bumper fascia 26.

Figure 4:
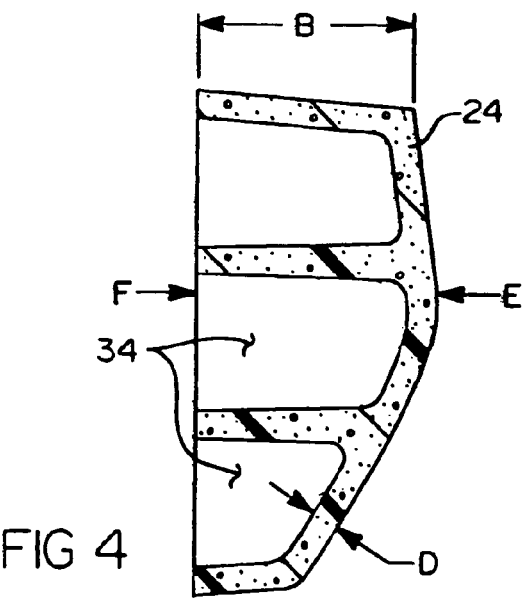
FIG. 4 is a cross-sectional view taken at Section 4—4 of FIG. 3.

Referring now to FIG. 4, a cross-sectional view through a partial cavity 34 identifies that a fascia wall thickness "D" is nominally provided for foam member 24. Wall thickness "D" can vary between approximately 4 mm to approximately 50 mm within the scope of the present invention. A wall thickness "D" of 6 mm (approximately ¼ inch) is used in a preferred embodiment to optimize the weight and energy absorbing capability of foam member 24. FIG. 4 also shows that foam member 24 further includes a first or fascia face "E" and a second face "F". Foam ribs 30 and foam cross-ribs 32 (shown in FIG. 3) are typically formed on second face "F" such that partial cavity 34 is formed adjacent to second face "F". First face "E" has a "substantially uniform" face. The substantially uniform first face "E" of foam member 24 is substantially free of partial cavities, and can vary between a planar face, a set of planar faces, a curved face, or a combination of these, depending upon the geometry of receiving bumper fascia 26. Part length "A" and part height "C" will vary depending on the size of the mating bumper fascia 26. Part depth "B" can vary depending upon the overall size and stiffness required for foam member 24. An approximate part depth "B" of 76 mm (approximately 3 inches) is used in a preferred embodiment of the present invention. Part length "A", part depth "B", and part height "C" can vary depending upon the end use of foam member 24, and are not limited to the dimensions identified herein for the preferred embodiment.

Figure 5:
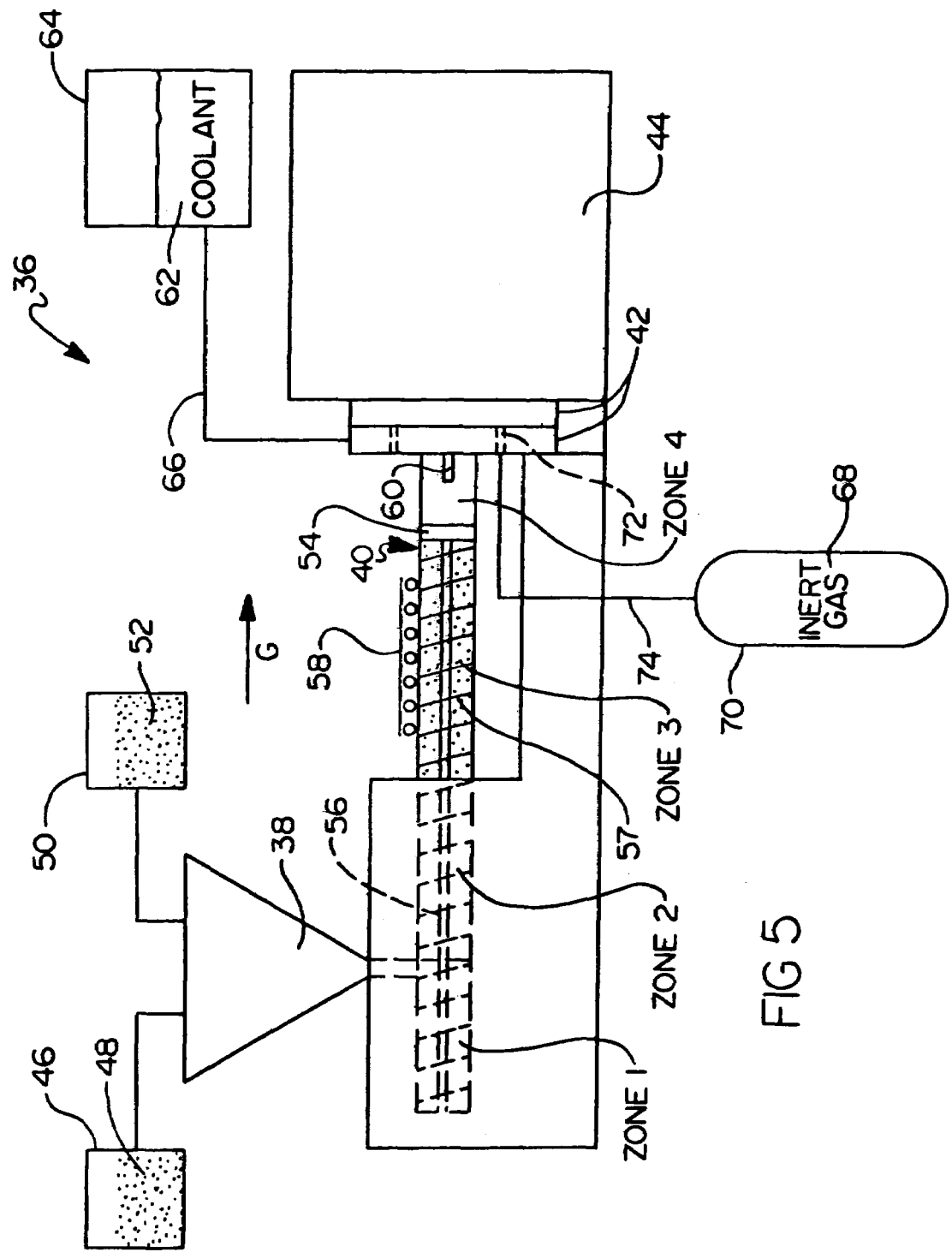
FIG. 5 is a diagrammatic view of an injection molding machine operable to carry out a method of forming a foam member according to an exemplary method of the present invention.

Referring next to FIG. 5, an injection device shown herein in an exemplary embodiment comprises an injection molding machine used to form foam members 24. Injection device 36 includes a mixing chamber 38, a ram/screw section 40, a mold 42, and a mold hydraulic section 44, which acts to retain mold 42 in a closed condition during the injection process. In operation, a resin source 46 provides a resin 48 and a blowing agent source 50 provides a blowing agent 52. Resin 48 and blowing agent 52 are mixed, by predetermined weights and/or volume percentages, within mixing chamber 38 and transferred to ram/screw section 40.

Ram/screw section 40 includes a ram 54 which is mounted to translate within ram/screw section 40 on a screw threaded shaft 56. A mixture 57 of resin 48 and blowing agent 52 is received within ram/screw section 40 and heated by at least one heating element 58. Mixture 57 is heated to its melting point such that in liquid form mixture 57 can be injected through injection nozzle 60 into mold 42.

Mold 42 is cooled by directing a coolant 62 from a coolant source 64 via at least one coolant tube 66 to mold 42. In a preferred embodiment, coolant 62 is chilled water cooled to a temperature of approximately 65° F. or cooler. Coolant 62 is intended to cool at least the perimeter area of mold 42 to an ambient or lower than ambient temperature. In a preferred embodiment, it is desirable to cool mold 42 to approximately 80° F. or cooler. An ambient temperature for mold 42 is the temperature within the manufacturing facility, which normally is at a maximum of approximately 100° F. and preferably less. A flow of coolant 62 is maintained both before, during, and after the injection process to maintain the temperature of mold 42 at or below ambient temperature as well as to cool mixture 57 when received by mold 42.

In addition to coolant 62, and depending upon the geometry of the foam member 24 produced, as well as the geometry of mold 42, further cooling of mixture 57 can be obtained by injecting an inert gas 68 from an inert gas source 70 via one or more injection pins 72 directly into mold 42. Inert gas 68 flows from inert gas source 70 to the one or more injection pins 72 via a gas supply line 74 (a single supply line 74 is shown for clarity). When inert gas 68 reaches mixture 57, one or more small bubbles of the gas are formed within mixture 57, which both acts to cool mixture 57 as well as to assist in forcing mixture 57 to completely fill the cavity of mold 42. Inert gas 68 can also be pre-cooled to an ambient or sub-ambient temperature to further enhance the cooling process. Using one or more of coolant 62 and inert gas 68, a cooling time for foam member 24 formed within mold 42 is reducible to below 10 minutes. In a preferred embodiment, a mold cycle time of approximately 1 minute is achievable. Mold cycle time is defined herein as the time required between repeating/successive events, which can include the time interval between initiating material input into the mixing chamber for a first and a subsequent second part, or more commonly, the time interval between removing a first cooled part from the mold and removing a subsequent or second cooled part from the mold. Foam members 24 are not required to be completely cooled to ambient temperature prior to removal from mold 42. Removal can be timed to correspond with hardening of foam member 24 to a point sufficient to establish rigidity and ability to retain its desired shape.

When mixture 57 is heated by heating elements 58, a temperature for mixture 57 can reach in excess of 400° F. The particular temperature for injection of mixture 57 is commonly above 200° F., and can vary depending upon the materials selected, and the various features of mold 42 including its overall size, the desired wall thickness of foam member 24, and the type and temperature of coolant used in the process. As mixture 57 is heated within ram/screw section 40, the screw portion of screw threaded shaft 56 and ram 54 apply a pressure in an injection direction "G" to maintain mixture 57 at a minimum pressure required to avoid gas produced by heated blowing agent 52 from causing premature expansion of mixture 57 within ram/screw section 40. In a preferred embodiment, this pressure is approximately 2000 psi, but this pressure can also vary depending upon the above identified variables used in determining the temperature.

The process for forming foam member 24 is also controllable by controlling the speed of progression of ram 54. This is accomplished by controlling the rotation speed of screw threaded shaft 56. Either a steady or a non-steady injection rate forcing mixture 57 into injection nozzle 60 can be used, depending upon the above variables and the geometries of both foam member 24 and mold 42. Ram 54 commonly travels approximately 2–3 inches during an injection stroke. In a preferred embodiment, using an exemplary 500 ton molding machine, a non-steady injection rate producing an approximate velocity profile of 3.0 in/sec for the first 50% of ram 54 travel, 2.0 in/sec for the next 30% of the ram 54 travel, and 1.8 in/sec for the last 20% of ram 54 travel is used.

For zones 1–4 shown in FIG. 5, temperature is controllable such that the preferred temperature profile of mixture 57 (using polyethylene resin and Hydrocerol® 1700 as the blowing agent) across ram/screw section 40 is: in zone 1, 285° F.; in zone 2, approximately 420° F. is preferred to set off the blowing agent; in zone 3, 400° F.; and in zone 4, the preferred nozzle injection temperature for mixture 57 is approximately 380° F. It should be noted that the velocity profile and temperatures given herein are exemplary for the preferred materials, and a variety of velocity profiles and temperatures can be used within the spirit and scope of the present invention for both the preferred materials and the other materials identified herein.

In another aspect of the present invention, the fabrication process is performed by extruding the polymeric material resin 48 and blowing agent 52, as mixture 57, using a single or a double screw extruder (not shown) known in the art. The mixture 57 is extruded into a mold without an "injection" step of an injection molding machine, and a final part is completed by coining or compression molding.

In a preferred embodiment of the present invention, materials for the foam member 24 include polyethylene as the resin and Hydrocerol® 1700, which is available from the Clariant Corporation, used as the blowing agent. A linear low density polyethylene is preferred. Alternate materials can also be used for a foam member of the present invention. Alternate materials for the resin material include, but are not limited to, at least one of: polyurethane, polyethylene, polypropylene, polyester, polycarbonate/polyester alloys, ethylene vinyl acetate copolymer (EVA), amide (nylon), ionomer, polycarbonate, acrylonitrile butadiene styrene (ABS), polybutylene therephthalate (PBT), thermal plastic olefin (TPO), thermoplastic elastomer (TPE), polyethylene terephtalate (PET), polyethylene terephtalate copolymer with Glycol (PETG), acetyl, and/or polyphenyline oxide including NORYL®. One or more of these materials can be used, depending on factors including: the energy absorption, material shrink, heat stability, processing speed, compatibility with other materials, and/or reprocessing capability of the material or material combination for suitability as an energy absorbing material.

Additional types of blowing agents can also be used including Polybatch® XU-1515, available from A. Schulman Inc., azodicarbonamides, phenyltetrazoles or bicarbonates/acids known in the art. In addition to the preferable use of an injection molding machine to provide parts of the present invention, additional methods including extrusion, blow-molding, and compression molding processes can also be used. Foam prepared by the process of the present invention is intended to meet Federal regulations for motor vehicle safety. Any material or material combinations that sufficiently meet the energy absorption requirements to pass the test requirements of the Federal regulations can be used for the foam element or processes of the present invention.

The foam made by this method can be controlled by the blowing agent used, the blowing agent percentage, the processing temperatures in the mold, the injection machine used and the speed that the foam is injected into the mold by the ram. The injection speed for example can affect the amount of foaming present in the part. A faster injection speed is desirable to reduce the weight of the finished part while providing the same part volume. In a preferred embodiment of the invention, for a part having a weight of approximately 2 to 5 pounds, an injection speed of less than one second is desirable, and an injection speed of less than or equal to 0.5 seconds is preferred. At an injection speed of approximately 0.5 seconds, the foam injected into a bumper part will produce a finished part with a weight of less than 50% of that of an unfoamed part.

For parts produced in a process or design with the mold filled in 1 second or less, an impact resistance type foam having some compression to the touch (a "soft feel") is produced having a weight approximately 40% of an unfoamed part. Reducing the weight of the foamed part is desirable for many applications requiring impact resistance performance.

An injection "rate" of the resin and foaming agent of approximately 7 pounds/sec is a preferred rate at the injection speed of 0.5 seconds to achieve parts weighing less than 50% of that of an unfoamed part. The amount of foaming agent used is preferably between approximately 2% to approximately 4% by weight of the resin.

In another preferred embodiment of the present invention, foamed parts are made using a combination of an extrusion and injection molding process. In this embodiment, the mixture of resin and blowing agent is extruded into a separate chamber, then subsequently injected into a mold at a high injection speed, giving the foam its desired consistency. The purpose of this process is to further increase the injection speed, which provides the desired foam consistency.

Figure 6:
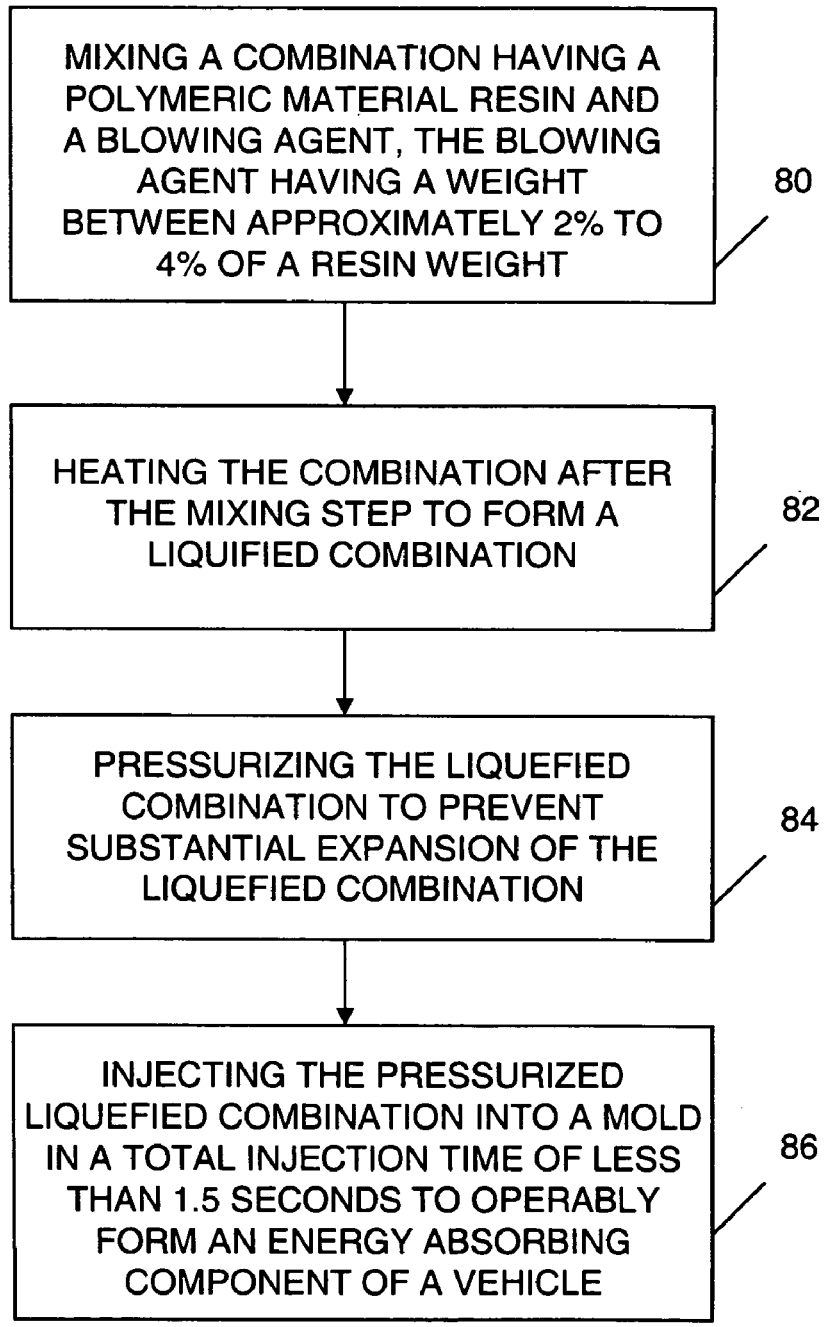
FIG. 6 is a flow diagram of the steps for forming a foam member of the present invention.

Referring generally to FIG. 6, the steps to form a foam part of the present invention include: mixing a combination having a polymeric material resin and a blowing agent, the blowing agent having a weight between approximately 2% to 4% of a resin weight (80); heating the combination after the mixing step to form a liquefied combination (82); pressurizing the liquefied combination to prevent substantial expansion of the liquefied combination (84); and injecting the pressurized liquefied combination into a mold in a total injection time of less than 1.5 seconds to operably form an energy absorbing component of a vehicle (86).

Figure 7:
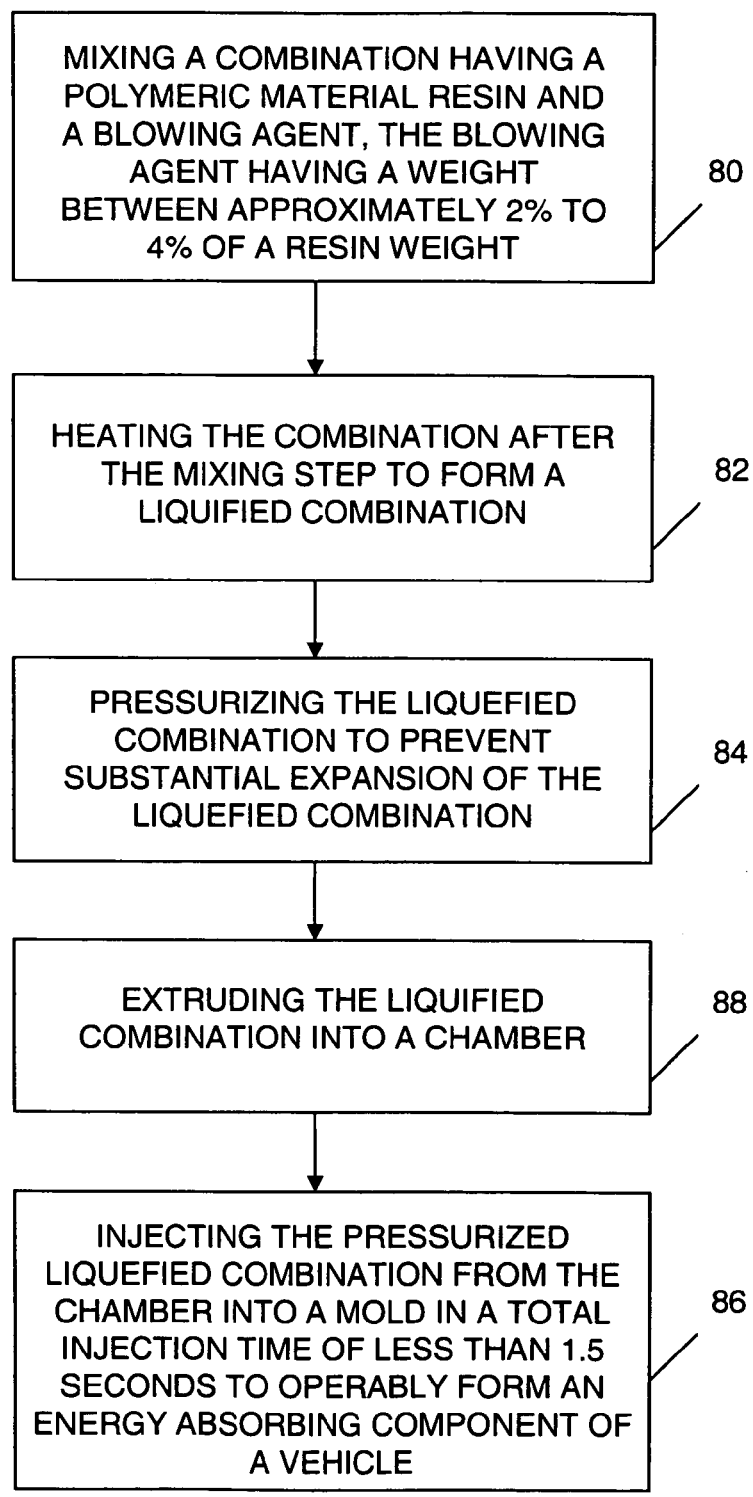
FIG. 7 is a flow diagram similar to FIG. 6, adding an extrusion step prior to the injecting step.

In an alternate embodiment shown in FIG. 7, prior to the injecting step (86), the liquefied combination is first extruded into a chamber (88). The pressurized liquefied combination is then injected from the chamber into the mold. This is an alternate method to increase the overall injection speed and decrease an overall injection time.

There are several advantages of the foam and processes for preparing the foam of the present invention. By controlling the pressure and temperature of the mixture of resin and foaming agent, as well as limiting the wall thickness to approximately 6 mm (approximately one quarter inch), foam parts of the present invention meet necessary energy absorption requirements, while improving the overall cycle time to produce the parts. By controlling the type of coolant and the temperature of the coolant used to cool the foam part of the present invention, mold cycle times as low as about one minute are attainable. Through use of injection molding or extrusion processes, less expensive resin material can be used which reduces the overall cost of the part, compared to resin bead material normally used for steam chest molding. By varying the wall thickness of foam parts of the present invention, from about 4 mm to approximately 50 mm, and preferably establishing a rib wall thickness of about 6 mm, foam parts of the present invention absorb impact load without initiating vehicle safety systems. Foam parts of the present invention are herein identified for use as inserts in vehicle bumpers, however, foam parts of the present invention can also be used as reinforcement members for vehicle door panels, body panels, and hood panels, where impact loads are also absorbed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming energy absorbing components for vehicles, the method comprising:
    mixing a combination having a polymeric material resin and a blowing agent, the blowing agent having a weight between approximately 2% to 4% of a resin weight;
    heating the combination after the mixing step to form a liquefied combination;
    pressurizing the liquefied combination to prevent substantial expansion of the liquefied combination;
    injecting the pressurized liquefied combination into a mold in a total injection time of less than 1.5 seconds to operably form an energy absorbing component of a vehicle;
    varying a ram progression speed during the injecting step to operably divide the injecting step into at least two injection portions; and
    decreasing a velocity profile of the liquefied combination in successive ones of the injection portions.

2. The method of claim 1, further comprising controlling an injection speed of the liquefied combination into the mold to achieve a total injection time of approximately 0.5 seconds.

3. The method of claim 1, further comprising injecting the liquefied combination at an injection rate of approximately 7 pounds per second.

4. The method of claim 1, further comprising:
    initiating motion of a ram to perform the injecting step;
    changing a ram progression speed during the injecting step; and
    varying a rate of injection flow of the liquefied combination into the mold during the injecting step.

5. The method of claim 1, further comprising maintaining a surface temperature of the mold at or below an ambient temperature prior to the injecting step.

6. The method of claim 1, further comprising:
    maintaining a continuous coolant flow to the mold;
    retaining the energy absorbing component in the mold for approximately one minute after the injecting step; and
    removing the energy absorbing component from the mold.

7. The method of claim 1, further comprising:
    connecting a source of chilled water to the mold; and
    directing a chilled water volume to the mold to assist cooling the mold.

8. A method for forming energy absorbing components for vehicles, the method comprising:
    mixing a combination having a polymeric material resin and a blowing agent, the blowing agent having a weight between approximately 2% to 4% of a resin weight;
    heating the combination after the mixing step to form a liquefied combination;
    pressurizing the liquefied combination to prevent substantial expansion of the liquefied combination;
    injecting the pressurized liquefied combination into a mold in a total injection time of less than 1.5 seconds to operably form an energy absorbing component of a vehicle; and
    inserting at least one coolant pin through the mold to operably contact the component.

9. The method of claim 8, further comprising:
    connecting a source of coolant gas to the coolant pin; and
    flowing a coolant gas into the component through the coolant pin.

10. A method for constructing energy absorbent bumpers for a motor vehicle, comprising the steps of:
    combining a polymeric resin and a foaming agent into a foam mixture;
    maintaining a weight percentage of the foaming agent between approximately 2% to approximately 4% of a polymeric resin weight;
    injection molding the foam mixture into a mold to operably form an energy absorbing foam component;
    limiting a total mold cycle time to approximately one minute by operably cooling the foam mixture in the mold by direct contact with a cooling medium;
    inserting the energy absorbing foam component into a bumper assembly; and
    attaching the bumper assembly onto a bumper beam of a vehicle.

11. The method of claim 10, comprising forming a plurality of ribs in the foam component.

12. The method of claim 11, comprising varying a quantity of the ribs to operably alter a load absorption capability of the foam component.

13. The method of claim 10, comprising varying a wall thickness of the foam component to operably alter a load absorption capability of the foam component.

14. The method of claim 10, comprising inserting the foam component into a preformed bumper fascia.

15. A method for forming energy absorbing components for vehicles, the method comprising:
   mixing a combination having a polymeric material resin and a blowing agent;
   heating the combination after the mixing step to form a liquefied combination;
   pressurizing the liquefied combination to prevent substantial expansion of the liquefied combination prior to injection;
   cooling a mold operable to receive the liquefied combination;
   displacing a ram having all of the liquefied combination positioned in a flow path of the ram;
   injecting the liquefied combination into the mold using the ram to operably form an energy absorbing component of a vehicle; and
   changing a ram progression speed during the injecting step to operably vary a rate of injection flow of the liquefied combination into the mold.

16. The method of claim 15, comprising maintaining a surface temperature of the mold at or below an ambient temperature prior to the injecting step.

17. The method of claim 15, comprising:
   maintaining a continuous coolant flow to the mold;
   retaining the energy absorbing component in the mold for approximately one minute after the injecting step; and
   removing the energy absorbing component from the mold.

18. The method of claim 15, comprising:
   connecting a source of chilled water to the mold; and
   directing a chilled water volume to the mold to assist cooling the mold.

19. The method of claim 15, further comprising:
   changing the ram progression speed during the injecting step to provide at least two non-zero ram progression speeds.

20. The method of claim 15, further comprising:
   connecting a screw threaded shaft to the ram;
   rotating the screw threaded shaft to initiate ram displacement; and
   changing the progression speed of the ram during the injecting step to define at least three portions of the ram displacement.

21. A method for forming energy absorbing components for vehicles, the method comprising:
   mixing a combination having a polymeric material resin and a blowing agent;
   heating the combination to form a liquefied combination;
   pressurizing the liquefied combination to prevent substantial expansion of the liquefied combination prior to injection;
   cooling a mold operable to receive the liquefied combination;
   injecting the liquefied combination into the mold to operably form an energy absorbing component of a vehicle; and
   positioning at least one coolant pin in the mold in operable contact the energy absorbing component to directly cool the energy absorbing component.

22. The method of claim 21, comprising:
   connecting a source of coolant gas to the coolant pin; and
   flowing a coolant gas into the component through the coolant pin.

23. The method of claim 22, comprising pre-chilling the coolant gas prior to the flowing step.

24. A process to produce an energy absorbing material, comprising:
   predetermining a wall thickness for an energy absorbing component;
   forming a mold for the energy absorbing component;
   mixing a combination having a polymeric material resin and a blowing agent;
   heating the combination after mixing to create a liquefied combination;
   ram injecting the liquefied combination into a mold;
   cooling the mold using one of an ambient temperature and a below ambient temperature coolant;
   positioning at least one coolant injection pin in the mold in fluid communication with the liquefied combination in the mold;
   controlling a temperature, a pressure, and an injection rate of the liquefied combination to operably form a foam part having the predetermined wall thickness.

25. The process of claim 24, comprising selecting the wall thickness within a range of wall thicknesses varying between approximately 4.0 mm and approximately 50 mm.

26. A process to produce an energy absorbing material, comprising:
   predetermining a wall thickness of approximately 6 mm for an energy absorbing component;
   creating a mold for the energy absorbing component operable to produce the selected wall thickness;
   mixing a combination having a polymeric material resin and a blowing agent;
   heating the combination to form a liquefied combination;
   ram injecting the liquefied combination into a mold; and
   controlling a temperature, a pressure and a ram injection rate of the liquefied combination to create a foamed polymeric part having the predetermined wall thickness.

27. The process of claim 26, comprising flowing an inert gas into a coolant injection pin and through the coolant injection pin into the liquefied combination to operably cool the liquefied combination.

28. The process of claim 26, comprising controlling a total mold cycle time to less than ten minutes.

29. The process of claim 26, comprising cooling both the mold and the foamed polymeric part to operably provide a mold cycle time of approximately one minute.

* * * * *